(12) United States Patent
Scott et al.

(10) Patent No.: US 8,370,180 B2
(45) Date of Patent: Feb. 5, 2013

(54) TOKEN DELIVERY SYSTEM

(75) Inventors: Andrew Ewart Scott, Clayton (AU);
David Arthur Jewell, Tecoma (AU);
Timothy Winston Hibberd, Neutral Bay (AU)

(73) Assignee: Telestra Corporation Limited, Melbourne, Victoria (AU)

( * ) Notice: Subject to any disclaimer, the term of this patent is extended or adjusted under 35 U.S.C. 154(b) by 1548 days.

(21) Appl. No.: 10/296,932

(22) PCT Filed: Jun. 1, 2001

(86) PCT No.: PCT/AU01/00656
§ 371 (c)(1),
(2), (4) Date: May 27, 2003

(87) PCT Pub. No.: WO01/93120
PCT Pub. Date: Dec. 6, 2001

(65) Prior Publication Data
US 2003/0182242 A1    Sep. 25, 2003

(30) Foreign Application Priority Data

Jun. 1, 2000    (AU) .................................. PQ 7901

(51) Int. Cl.
*G06Q 10/00* (2012.01)
(52) U.S. Cl. .......................................................... 705/5
(58) Field of Classification Search ................ 705/5
See application file for complete search history.

(56) References Cited

U.S. PATENT DOCUMENTS

| | | | |
|---|---|---|---|
| 5,091,634 A * | 2/1992 | Finch et al. ................ 235/375 |
| 5,128,520 A | 7/1992 | Rando et al. |
| 5,789,732 A | 8/1998 | McMahon et al. |
| 5,806,044 A | 9/1998 | Powell |
| 5,855,007 A | 12/1998 | Jovicic et al. |
| 5,907,830 A | 5/1999 | Engel et al. |
| 5,943,423 A * | 8/1999 | Muftic ............................ 705/67 |
| 6,032,260 A * | 2/2000 | Sasmazel et al. ............... 726/10 |
| 6,041,374 A | 3/2000 | Postman et al. |

(Continued)

FOREIGN PATENT DOCUMENTS

| CA | 2 336 001 A1 | 6/1998 |
|---|---|---|
| EP | 1077437 | 2/2001 |

(Continued)

OTHER PUBLICATIONS

Weisbecker, L., "Local E-Firm's 'Got the Ticket': Serving the Triangle's Business Communities Serving the Triangle's Business Communities," The Business Journal, 15(31), 5-5, Mar. 31, 2000.*
WWW.REGISOFT.COM, Dec. 19, 2002, RegiSoft.
WWW.GOFUSE.COM/ENCRYPTIX/04-NEWSWORTHY/ INTHENEWSPR.NEWS-SRTICLE-1.HTML, Dec. 19, 2002, Donahue, Anne.

*Primary Examiner* — Nathan Erb
(74) *Attorney, Agent, or Firm* — Nixon Peabody LLP

(57) ABSTRACT

A token process including storing transaction data for purchase of a product, generating a token for redemption of the product, providing access to the token over a communications network, and sending the token to a handheld device on receipt of a request for the token, the token being readable from the handheld device by a reading device at point of provision of the product. A handheld device including wireless communication means for receiving ticket data, the ticket data adapted to generate a visual display on said handheld device readable by a reading device to redeem a product corresponding to the ticket.

19 Claims, 6 Drawing Sheets

U.S. PATENT DOCUMENTS

| | | | | |
|---|---|---|---|---|
| 6,067,532 A | * | 5/2000 | Gebb | 705/37 |
| 6,076,069 A | * | 6/2000 | Laor | 705/14 |
| 6,311,214 B1 | * | 10/2001 | Rhoads | 709/217 |
| 6,484,197 B1 | * | 11/2002 | Donohue | 709/206 |
| 7,093,130 B1 | * | 8/2006 | Kobayashi et al. | 713/176 |
| 7,113,929 B1 | * | 9/2006 | Beach et al. | 705/65 |
| 7,177,838 B1 | * | 2/2007 | Ling | 705/41 |
| 2002/0023955 A1 | * | 2/2002 | Frank et al. | 235/382 |
| 2003/0105641 A1 | * | 6/2003 | Lewis | 705/1 |
| 2003/0163787 A1 | * | 8/2003 | Hay et al. | 715/522 |

FOREIGN PATENT DOCUMENTS

| | | |
|---|---|---|
| WO | WO 97/23838 A1 | 7/1997 |
| WO | WO/03328 | 1/2000 |
| WO | WO/62564 | 10/2000 |
| WO | WO/68858 | 11/2000 |

* cited by examiner

TOKEN DELIVERY SYSTEM

FIELD OF THE INVENTION

The present invention relates to a system and a process for use in validation, and in particular to a system that facilitates the distribution and use of virtual tokens for products, such as goods, services, discounts and/or exchange offers.

BACKGROUND OF THE INVENTION

Electronic, "virtual" tickets, tokens or vouchers have been developed in various forms to enable the provision of goods or services. The tokens may entitle the holder to a variety of different products, such as access to transport facilities and admission to entertainment or sporting events. In situations where the purchaser of goods or services wishes to redeem a virtual "proof of purchase" token in person, existing systems require the purchaser to print a physical token and exchange it for the good or service. This eliminates the need for the provider to generate a physical token and deliver it to the purchaser, but it still requires a physical token to be generated and maintained by the purchaser. The tokens are also static in that they are redeemed for a predetermined instance of a particular product. It is desired therefore to provide a system and a process that alleviates these restrictions, or at least provides a useful alternative.

SUMMARY OF THE INVENTION

In accordance with the present invention there is provided a token process, including sending a virtual token from a network device to a handheld device to generate a machine-readable representation of the token in the handheld device.

The present invention also provides a token process, including downloading a virtual token from a network device to a handheld device to generate a machine-readable representation of the token on the handheld device, so that the representation may be read with a reading device to validate said token.

The present invention also provides a token process including:
storing transaction data for purchase of a product;
generating a token for redemption of said product;
providing access to said token over a communications network; and
sending said token to a handheld device on receipt of a request for said token,
said token being readable from said handheld device by a reading device at point of provision of said product.

The present invention also provides a token system including:
a transaction server accessed over a communications network, said server storing transaction data for purchase of a product, and generating a token for redemption of said product, said token being accessible over said network from said server such that said token is sent to a handheld device on receipt of a valid request for said token from said handheld device.

The present invention also provides a handheld device including wireless communication means for receiving ticket data, said ticket data adapted to generate a visual display on said handheld device readable by a reading device to redeem a product corresponding to said ticket.

BRIEF DESCRIPTION OF THE DRAWINGS

Preferred embodiments of the present invention are hereinafter described, by way of example only, with reference to the accompanying drawings, wherein.

Figure 1:
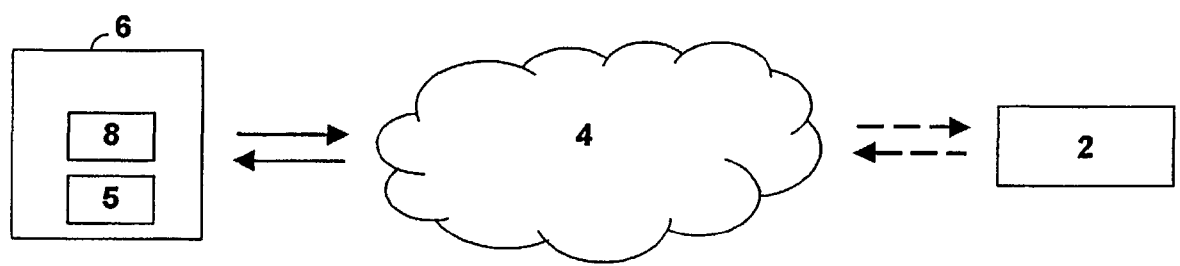
FIG. 1 is a block diagram of a preferred embodiment of a token transmission system of the token system.
Figure 2:
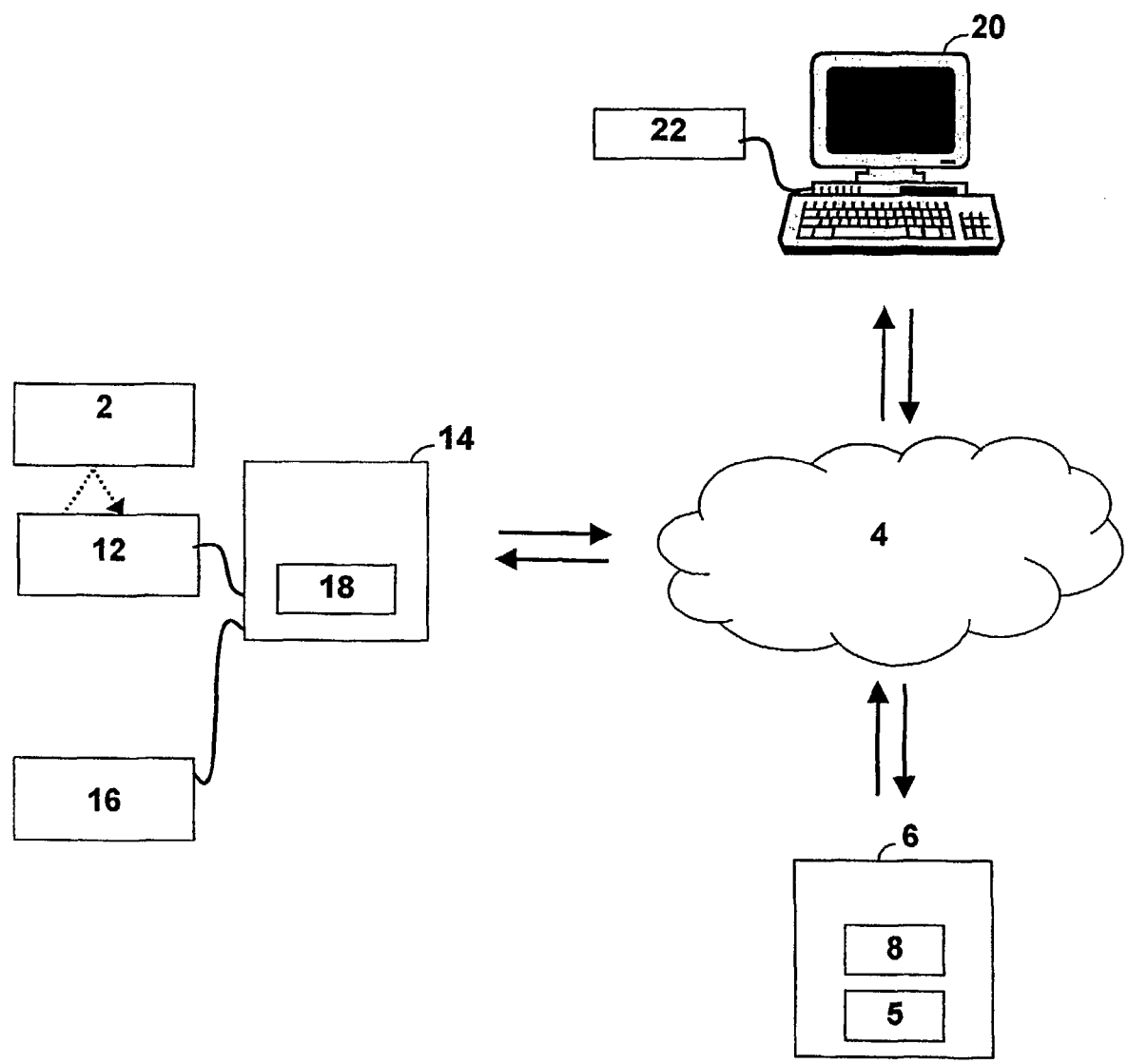
FIG. 2 is a block diagram of a preferred embodiment of a reading system of the token system.

A validation system includes a token transmission system as shown in FIG. 1 and a reading system as shown in FIG. 2. The transmission system transmits virtual tokens to a handheld device 2, such as Wireless Application Protocol (WAP) capable mobile telephone. The transmission system includes a database 5 on a server 6 which is connected to the WAP telephone 2 via the Internet or mobile data networks, constituting a communication network 4.

The server 6 further includes a transaction module 8 that operates to store, maintain and process data held in the database 5. The server 6 may be a standard computer system, such as a Sun Microsystems server, having software stored thereon so that the server 6 is able to operate as a web and/or WAP server, and together also with software to provide the transaction module 8 and the database 5. Alternatively, the server 6 may include dedicated hardware circuits to execute at least some of the steps of the software components. The hardware and software components of the server 6 may also be distributed over a communications network, such as the Internet 4. The reading system reads and validates virtual tokens and includes the WAP telephone 2, a barcode reader 12 and an entry gate 16 connected to a networked computer 14 having a read module 18. The computer 14 can be connected through the Internet 4 to the server 6. The entry gate 16 may be a physical gate or a device operated by a person which includes the reader 12.

Figure 4:
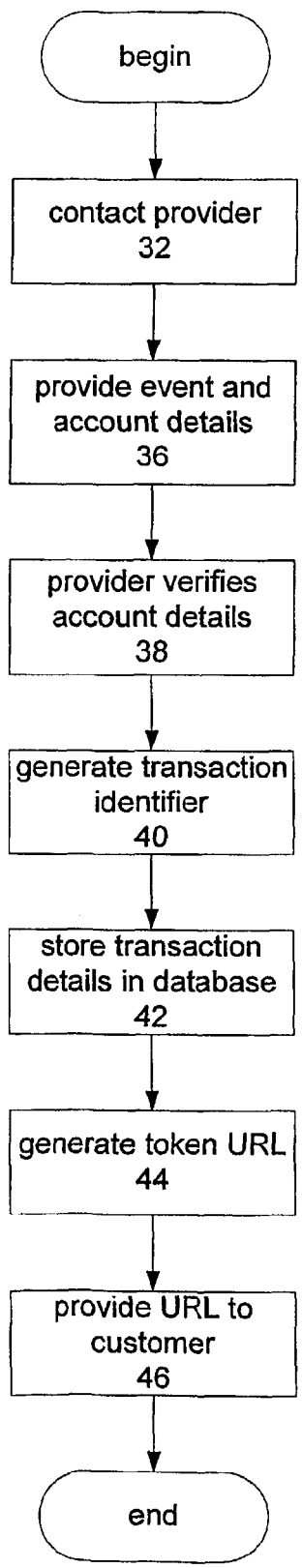
FIGS. 4, 5 and 6 are flow diagrams of a token process executed by the system.

A person with the WAP-capable mobile telephone 2 who wishes to attend an event can, at some time prior to the event, purchase a virtual token for the event. The token could be purchased over the Internet using a computer or using the WAP telephone using most transaction methods. For example, the person may simply dial a 1-900 service. However, a case shall be described below wherein the token is purchased using a web browser, as shown in FIG. 4. The cost of the token is debited from a line of credit such as a telephone or credit card account, or a pre-paid account. The provider of the validation system may charge a percentage of the purchase cost.

The transaction begins when the customer contacts the event provider, which occurs when the customer accesses the provider's web site at step 32. The customer provides event and account details to the provider at step 36. The account details may include a credit card or other account number, together with supporting data such as a personal identification number (PIN), password, or the credit card name and expiry details. After the transaction is approved at step 38, a transaction identifier is generated by the transaction module 8, and at step 42 this is recorded in the database 5 along with other transaction details including event and identification data. The identification data is unique to the purchaser and includes the mobile telephone number and/or some other password or identification code.

When the person purchases the token as described above, the server 6 generates a unique Universal Resource Locator (URL) for the token at step 44 and provides it to the customer at step 46. For easy access, this URL may be stored in the phone 2 by simply adding the URL to the browser's bookmarks.

Figure 3:
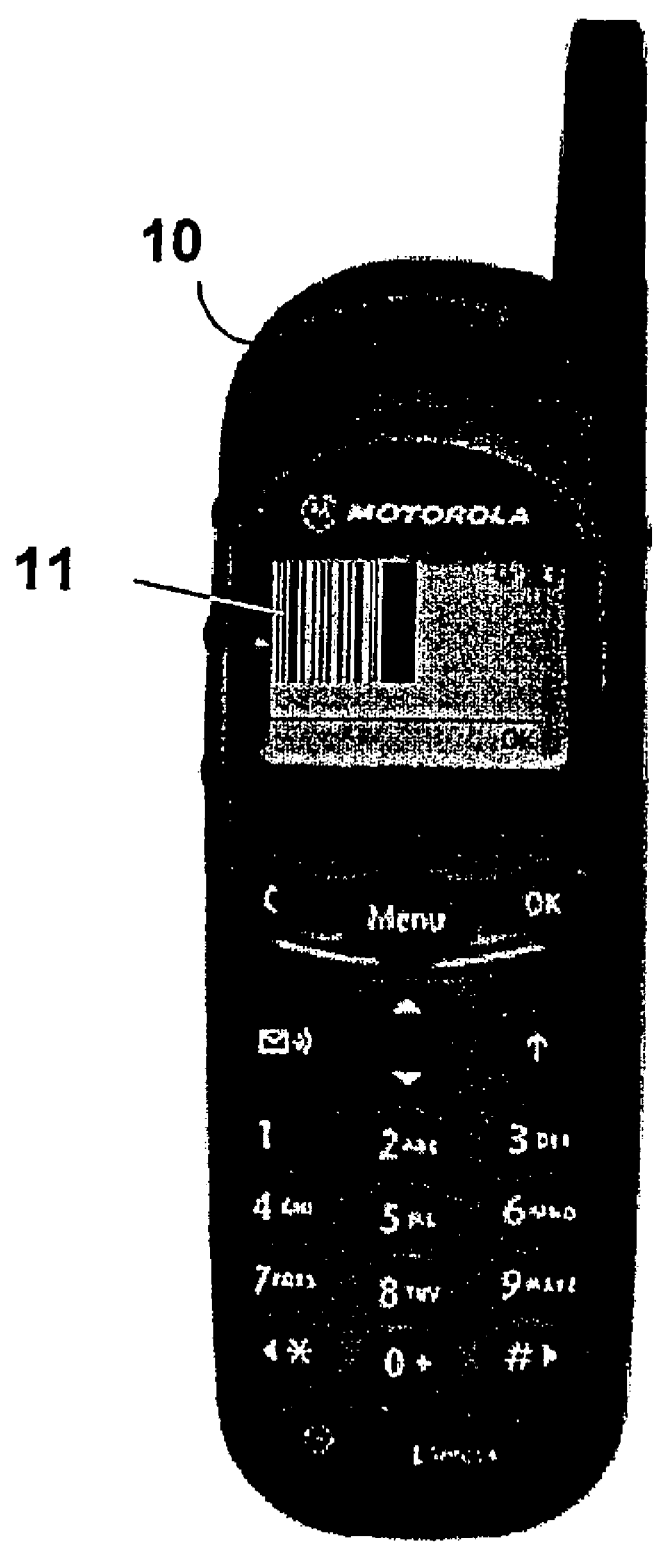
FIG. 3 shows a WAP mobile telephone of the token system.
Figure 5:
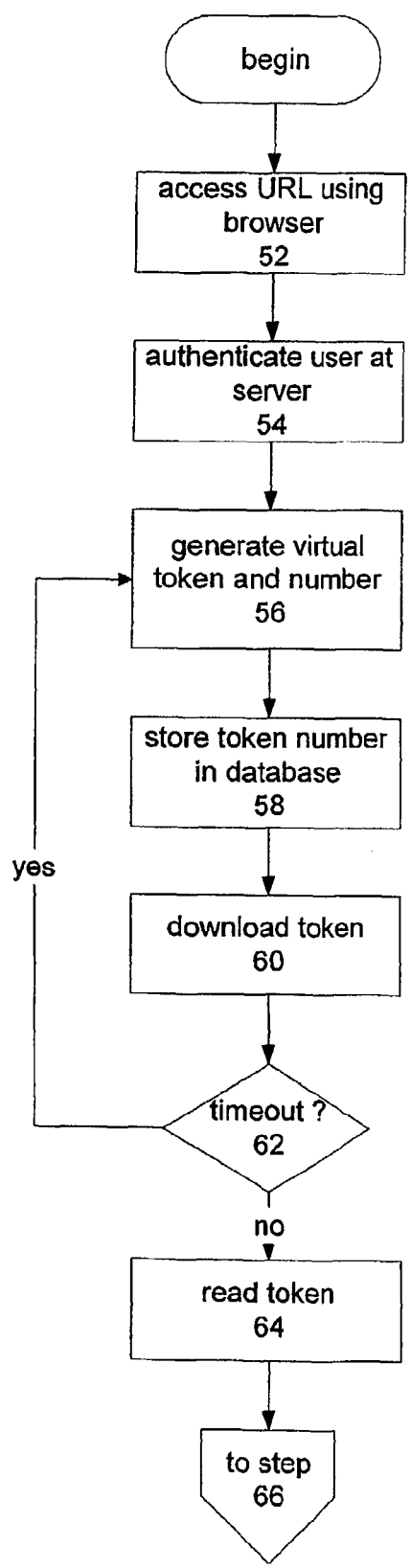
Figure 6:
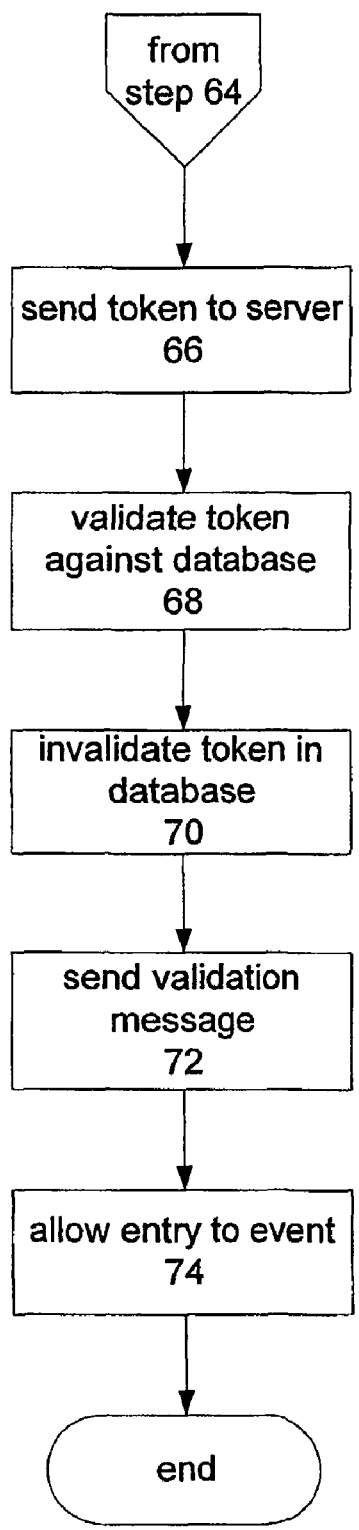

Before the person attends the event, they access the URL with application software on the phone, such as the phone's browser software at step 52, as shown in FIG. 5. When the server 6 receives a request to the URL, the server 6 first verifies the identity of the purchaser at step 54 using the identification data described above and data provided with the request, such as web Cookies or call record data within the communications network 4. If the identification is positive, the server 6 generates a new token number and corresponding barcode image at step 56, and the token number is stored in the database 5 at step 58. The barcode image is transferred to the phone 2 by WAP at step 60 so that the barcode is reproduced on the visual display of the phone 2, allowing the display to be read by a barcode reader. This is particularly advantageous as the displayed barcode can be read by existing barcode readers and the infrastructure supporting the readers does not have to be built or reconfigured. This allows the barcode to be used for all existing barcode applications, such as proof of purchase of goods or services. WAP provides a convenient way for the barcodes to be delivered from the server 6 and then displayed on the telephone. All known WAP phones (Motorola L-Series+, Nokia 7110, and Ericsson R320) are able to render web-server originated bar codes. For example, FIG. 3 shows a Motorola WAP mobile telephone 10 displaying a barcode 11. The Figure shows a one-dimensional barcode which is capable of encoding a 6 digit number, but two-dimensional barcodes which can encode 12 or more digit numbers are preferred. The number of digits which may be accurately represented by a barcode on a display screen is limited by the resolution of the screen. The higher the resolution, the larger the number of digits that may be represented.

The token number is a short-lived number generated by the transaction module 8 of the server 6 on the basis of the transaction details. The token lifetime is limited in order to improve security and to ensure that a large number of unused token numbers are available at any given time for reuse. Each time the server 6 receives a request for the supplied URL, it generates a new token number and barcode at step 56. The server 6 creates a web page containing an image of the new barcode and sends it to the phone 2. This web page includes the Wireless Markup Language (WML) refresh element so that the web page will automatically refresh after a specified period of time. This refresh period is chosen to be shorter than the token lifetime to allow for access and transmission delays. For example, a barcode with a 10 minute lifetime might be automatically replaced with a new barcode after 8 minutes by including an 8 minute refresh delay within the dynamically generated web page content. Thus, if the purchaser opens the bookmarked URL, the phone 2 checks to see if the barcode is in the phone's cache. If it is in the cache and the page has not expired, step 62, it is reloaded from the cache. Otherwise, a request for the URL is passed to the server 6, which generates a new token number and barcode at step 56 and transfers it to the phone 2 at step 60. While the barcode page remains active on the phone's browser, it is automatically refreshed at steps 56 to 62 and remains valid.

The barcode can be used as an entry ticket or to validate or authenticate the holder of the phone. For example, purchases of products or services can be effected or validated using the barcode on the phone 2. As shown in FIGS. 2, 3 and 5, the barcode 11 may be read from the WAP telephone 2 by a barcode reader 12 at step 64. The barcode reading accuracy is improved by using a CCD-based barcode reader with a white light source. Alternatively, digital video may be used to capture an image of the barcode, allowing the image to be processed in software. Once the numeric barcode value has been decoded by the read module 18, it is passed from the computer 14 to the server 6 via the Internet 4 at step 66. In order to validate the decoded value, the transaction module 8 of the server 6 checks it against data contained in the database 5 at step 68. This validation transaction is also recorded in the database 5 at step 70. The server 6 then returns a validation message at step 72 to the computer 14 which indicates a valid token and instructs the entry gate 16 to open at step 74. Alternatively, if the computer 14 and the reader 12 are contained within an integrated device, which may be handheld, the device may contain the data required to validate the token, eliminating steps 66 and 72. This data could be downloaded from the server 6 prior to each event.

Because the token is validated against a database 5 which stores data on each transaction, this facilitates extremely flexible ticketing arrangements. For example, many different kinds of tokens can be envisaged. Upon validation, a single-use token would be invalidated for subsequent transactions by recording the validation in the database. Alternatively, a multiple-use and/or multiple-vendor token may be validated multiple times and possibly by multiple vendors, with specific validations depending upon prior validations, the date or time of day, or the elapsed time since the token was generated. For example, a single token purchased for a football game could also be used for public transport to and from the game. The first 100 people who arrive before a certain time by public transport could be admitted free.

In an alternative embodiment, the barcode represents a number which contains encoded data so that the barcode is self-validating. The barcode number may be derived from a number of sources, including the WAP phone number, the date of an event, the vendor identification code, and another number within a consecutive set of numbers that may correspond for example to numbered seats. The sources can then be combined and if desired encrypted to generate the barcode number. This type of barcode is not short-lived, and may be stored in the telephone 2. When the token is to be redeemed for goods or services, the barcode on the phone 2 is scanned in the usual way. The barcode is decoded by the reader 12 and validated by the computer 14 without reference to the server 6. To validate the barcode number, the computer 14 unencrypts the scanned number or performs a one-way encryption of a number derived from the telephone number, the date, time and code of the event (or the product code in cases where a good or service has been purchased) for comparison with the barcode number. If a match is considered to have occurred, the barcode is validated. The computer 14 then stores the barcode so that the same barcode may not be reused for the same event or purchase.

In a further embodiment, the token is delivered to the phone by the SMS message mechanism instead of WAP. This mechanism is used with handsets that support picture SMS or operator logos (e.g., Nokia 3210, 5110, 5130, 6110, 6130, 6150, 7110, 8210, 8810, 8850 and 9110). Picture SMS can be used to transmit either one- or two-dimensional barcodes, and the operator logo mechanism can used to transmit one-dimensional barcode images. Alternatively, the GSM SIM Application Toolkit (GSM 11.4) may be used to send barcodes by SMS, provided that the phone 2 is able to cater for the receipt of SIM Application Toolkit image generation instructions.

A further alternative embodiment could use images downloaded to WAP or HTML capable browsers on personal data assistants (PDAs), such as the Palm Pilot™. The advantages over WAP telephones are that the screens are more easily read by scanners and that they support higher display resolutions.

The same underlying infrastructure may be used for barcode-based validation and smartcard-based validation. In yet another alternative embodiment, the handheld device 2 of the validation system is a smartcard rather than a telephone or a PDA. For example, the handheld device 2 may be a Chipper® card incorporating Chipper®'s ServiceBox technology. ServiceBox is a middleware layer distributed over the smartcard infrastructure, including the card, terminal, security modules, and collection system. ServiceBox enables dynamic activation of smartcard applications, such as ticketing, via a memory slot mechanism. Once allocated, a slot may be used an unlimited number of times. The ServiceBox layer guarantees that no other application can change the data stored in the slot. It also ensures that the data stored in a slot has been authorised by a valid security module (SAM), so that the data can be trusted. The slot remains allocated until it is explicitly released, which also deactivates the corresponding application.

A person wishing to attend an event may purchase a virtual token, as described above. For example, the person may choose to purchase their token from a web site using their home computer 20. Sometime prior to purchasing the ticket, the person registers with a ticketing provider. During registration, the person supplies their credit card details and other personal information to the ticketing provider. The person puts their smartcard 2 into a smartcard peripheral 22 attached to their home computer, and a unique customer identification number (ID) is generated and stored in a newly allocated slot in the smartcard 2. This registration procedure only needs to be completed once for a given ticketing provider. Current Chipper® cards have a maximum of six slots, restricting their use to a maximum of six different ticketing providers concurrently.

During the registration phase, the person enters their smartcard personal identification number (PIN), if any, together with smartcard details collected by a smartcard peripheral, and these details are securely submitted to the ticketing provider's server 6. Attached to the server 6 are a bank of security providers, such as Gemplus GCR410 card readers with dedicated security modules (SAMs) for Chipper® cards. The server 6 uses a security provider to generate a secure data stream in which a unique customer ID is embedded. This data is sent to the person's smartcard peripheral, which writes an entry into a free slot in the card. After registration, the smartcard 2 may be used to store a virtual token. During the token purchase, the person enters the event details together with the unique customer number stored in the slot of the smartcard 2. The server 6 stores a (customer, event) pair in the database 5.

Once the customer ID is stored in the smartcard 2, the validation process is essentially identical to that described above. When the person attends the event, they place their smartcard 2 in a reader 12 at the validation point. The reader extracts the data from the corresponding slot in the smartcard 2 and sends it to the validation point computer 14. The validation point computer 14 stores a number of event codes for events that it is willing to admit, such as a football match, different movies, etc. The validation point computer 14 sends the data read from the smartcard 2 and the list of event IDs to the server 6. If a barcode is used with a handheld device 2 in this scenario, then the server 6 translates the scanned value to a customer ID. However, when the handheld device 2 is a smartcard, the customer ID read from the smartcard 2 is transmitted to the server 6. The server 6 searches the database 5 for a matching (customer ID, event ID), given the set of event IDs from the validation point computer 14. If a match is found, the server 6 returns the match to the validation point computer 14, indicating that the token is valid. The token has now been validated, and the person is allowed entry to the event. The customer ID remains stored in the slot of the smartcard 2 after validation, and may be reused for subsequent events for the same ticketing provider.

In another application, a person may use the device 2 which includes an integrated barcode scanner. They may go to a store and fill a trolley with goods from the shelves, scanning the barcode of each good with the device 2 as they place it in the trolley. When they are finished, they pay for their shopping using the device 2, and a token is generated for "proof of purchase". On the way out of the store, a security guard, acting as the gate 16, scans the device 2 to ensure that the shopping was paid for.

Many modifications will be apparent to those skilled in the art without departing from the scope of the present invention as herein described with reference to the accompanying drawings. For example, the token may cause generation of a signal, such as sound, to effect validation.

The invention claimed is:

1. A token process, including:
    storing transaction data for purchase of a product during a redemption period, including identification data unique to a purchaser of the product, in a network database;
    at a time subsequent to storing transaction data for purchase of the product, receiving a request for a virtual token for redemption for the product and verifying the validity of the request using the stored identification data and data provided with the request;
    generating a virtual token having a first token number and a lifetime of a predetermined limited duration shorter than the redemption period for the product;
    sending the virtual token from a network device over a communications network to a handheld device to generate a machine-readable representation of the token in the handheld device following verification of the validity of the request for the token, the machine-readable representation of the token becoming invalid if not redeemed for the product within the lifetime of the virtual token;
    determining that the virtual token has become invalid from not being redeemed for the product within the lifetime of the virtual token;
    automatically creating an updated virtual token having a second token number different from the first token number when the virtual token has become invalid;
    updating the handheld device with a machine-readable representation according to the updated virtual token;
    receiving the updated virtual token from a reading device located at a point of provision of the product following reading the representation according to the updated virtual token from the handheld device with the reading device; and
    authorizing redemption of the product upon validation of the received updated virtual token against the transaction data in the network database.

2. A token process as claimed in claim 1, wherein said machine-readable representation is produced on a visual display of said handheld device.

3. A token process as claimed in claim 2, wherein said machine-readable representation on said visual display is a barcode.

4. A token process as claimed in claim 1, wherein said handheld device is a mobile telephone.

5. A token process as claimed in claim 1, wherein said handheld device is a personal digital assistant (PDA).

6. A token process as claimed in claim 1, wherein said handheld device is a smartcard.

7. A token process as claimed in claim 1, wherein validation of said token is performed by the reading device against said transaction data, of said network database, stored in said reading device.

8. A token process as claimed in claim 7, wherein said validation is dependent on previous validations.

9. A token process as claimed in claim 1, wherein said sending includes transmitting said token using a network communications protocol, such as TCP/IP, SMS, GPRS or WAP.

10. A token process as claimed in claim 1, wherein said token lifetime is determined by said transaction data.

11. A token process as claimed in claim 1, wherein the automatically creating includes generating a new virtual token after expiration of the token lifetime of the virtual token, the updated virtual token being the new virtual token.

12. A token process as claimed in claim 1, wherein the product is redeemable within a redemption period and the lifetime of the virtual token is distinct from the redemption period.

13. A token process as claimed in claim 1, wherein the product has a lifetime and the lifetime of the virtual token is independent of the lifetime of the product.

14. A token process as claimed in claim 1, further comprising reusing the first token number with another virtual token associated with a different purchaser.

15. A non-transitory computer readable storage medium, storing a computer program which, upon execution by a computer system, causes the computer system to perform operations comprising:
    storing transaction data for purchase of a product, including identification data unique to a purchaser of the product, in a network database;
    at a time subsequent to the storing transaction data for purchase of the product, receiving a request for a virtual token for redemption for the product and verifying the validity of the request using the stored identification data and data provided with the request;
    generating a virtual token having a first token number and a lifetime of a predetermined limited duration shorter than the redemption period of the product;
    sending the virtual token from a network device over a communication network to a handheld device to generate a machine-readable representation of the token in the handheld device following verification of the validity of the request for the token, the machine-readable representation of the token becoming invalid if not redeemed for the product within the lifetime of the virtual token;
    determining that the virtual token has become invalid from not being redeemed for the product within the lifetime of the virtual token;
    automatically creating an updated virtual token having a second token number different from the first token number when the virtual token has become invalid;
    updating the handheld device with a machine-readable representation according to the updated virtual token;
    receiving the updated virtual token from a reading device located at a point of provision of the product following reading the representation according to the updated virtual token from the handheld device with the reading device; and
    authorizing redemption of the product upon validation of the received updated virtual token against the transaction data in the network database.

16. A token system including a transaction server accessed over a communications network including:
    a processor;
    a database on a non-transitory computer-readable storage medium for storing transaction data for the purchase of a product, including identification data unique to a purchaser of the product; and
    a transaction module which upon execution by the processor, causes the processor to perform operations comprising:
        at a time subsequent to the storing of transaction data for the purchase of the product, receiving a request for a virtual token for redemption for the product and verifying the validity of the request using the stored identification data and data provided with the request;
        generating a virtual token having a first token number and a lifetime of a predetermined limited duration shorter than the redemption period of the product;
        sending the virtual token over the communications network to a handheld device to generate a machine-readable representation of the token in the handheld device following verification of the validity of the request for the token,
        the machine-readable representation of the token becoming invalid if not redeemed for the product within the lifetime of the virtual token;
        determining that the virtual token has become invalid from not being redeemed for the product within the lifetime of the virtual token;
        automatically creating an updated virtual token having a second token number different from the first token number when the virtual token has become invalid;
        updating the handheld device with a machine-readable representation according to the updated virtual token;
        receiving the updated virtual token from a reading device located at a point of provision of the product following reading the representation according to the updated virtual token from the handheld device with the reading device; and
        authorizing redemption of the product upon validation of the received updated virtual token against the transaction data in the network database.

17. A token system as claimed in claim 16, including a reading system having a reading device for reading said token and causing validation of said token, said reading device being at a point of provision of said product.

18. A token system as claimed in claim 17, wherein said product is a good or service.

19. A token system as claimed in claim 18, wherein the product comprises one or more of access to facilities, an event, a discount, or exchange for currency.

* * * * *

UNITED STATES PATENT AND TRADEMARK OFFICE
CERTIFICATE OF CORRECTION

| | | |
|---|---|---|
| PATENT NO. | : 8,370,180 B2 | Page 1 of 1 |
| APPLICATION NO. | : 10/296932 | |
| DATED | : February 5, 2013 | |
| INVENTOR(S) | : Scott et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1846 days.

Signed and Sealed this
Eighteenth Day of November, 2014

Michelle K. Lee
*Deputy Director of the United States Patent and Trademark Office*